United States Patent Office 3,817,860
Patented June 18, 1974

3,817,860
METHOD OF DISINFECTING WATER AND DEMAND BACTERICIDE FOR USE THEREIN
Jack L. Lambert and Louis R. Fina, Manhattan, Kans., assignors to The Kansas State University Research Foundation, Manhattan, Kans.
No Drawing. Continuation-in-part of application Ser. No. 86,246, Nov. 2, 1970, which is a continuation-in-part of application Ser. No. 881,923, Dec. 3, 1969, both now abandoned. This application Nov. 21, 1972, Ser. No. 308,553
Int. Cl. C02b 3/06
U.S. Cl. 210—29                                    5 Claims

ABSTRACT OF THE DISCLOSURE

A method of treating bacterially contaminated water for direct production of disinfected water ready for use, wherein the water is rendered bacterially sterile by passing it through a strongly basic anion exchange resin containing combined triiodide ($I_3^-$) without forming a detectable concentration of iodine in the disinfected water. The triiodide is combined in a stable form with the basic groups of the resin. Although the dissociation of the iodine of the resin-insolubilized triiodide is extremely low, the triiodide resins are highly bactericidal, the triiodide groups reacting on demand with bacteria in water suspensions to kill the bacteria. The invention also extends to this novel demand bactericide.

CROSS-REFERENCES

This application is a continuation-in-part of our copending application Ser. No. 86,246, filed Nov. 2, 1970, which was a continuation-in-part of our application Ser. No. 881,923, filed Dec. 3, 1969, and abandoned after the filing of said application Ser. No. 86,246. Application Ser. No. 86,246 was permitted to become abandoned after the filing of this application. The benefit of 35 USC § 120 is claimed.

BACKGROUND AND SUMMARY

There are relatively few ways chemically to treat water so that microorganisms are destroyed without leaving behind undesirable residual compounds. The most widely used treatment is that with chlorine. The other halogens, bromine and iodine, have been used much less and their usefulness has largely been left to the treatment of swimming pools. Ozone is the only other substance used in large scale treatment in competition with chlorine. Boiling of water is effective but cumbersome except on a small scale.

With the rapid growth in population and the attendant increase in pollution of our water supplies, few sources of water can be considered free of possible contamination. A convenient, safe and foolproof method would thus be of great value. For example, current methods of treatment of swimming pool water often leave residual chlorine in concentrations irritating to the eyes and mucous membranes. A disinfectant operating on the demand principle, as does the disinfectant of the present invention, thus would be expected to find wide acceptance.

Heretofore, anion exchange resins, such as the quaternary ammonium resins, have not been considered to be of much value for disinfecting water. Certain quaternary ammonium compounds when used in aqueous solutions have bactericidal properties, but ordinary quaternary ammonium anion exchange resins demonstrate only very weak bactericidal action. Thus water contaminated with live bacteria can be passed through a bed of strong base anion exchange resin without appreciably reducing the live bacteria therein.

Water disinfecting agents such as chlorine, bromine, and iodine are employed in their elemental rather than halide or salt form. It is well known that chloride, bromide, and iodide ions have little or no bactericidal action. For example, bacteria are not killed on being contacted with dilute aqueous solutions of sodium chloride, potassium iodide, etc. Triiodide ions in solution have been reported to have negligible germicidal properties compared to diatomic iodine or other halogens in elemental form. [See *J. Bacteriol.*, 69:413–417 (1955), and *Arch. Biochem.*, 6:261–268 (1945).]

U.S. Pat. No. 3,316,173 discloses a process for treating water with bromine wherein a strong base anion exchange resin is used as a source of diatomic or elemental bromine, the bromine being eluted from the resin to form a relatively concentrated aqueous solution, which is subsequently mixed with a larger volume of water, such as the water in a swimming pool, to provide a bactericidal concentration of bromine. The bromine is eluted from the resin in concentrations of from 10 to 10,000 p.p.m., which is far above physiologically acceptable levels of bromine in water for human consumption.

U.S. Pat. No. 3,462,363 discloses a further extension of the process of the cited patent, wherein a scavenger resin is used in tandem with a strong base anion-exchange resin in polyhalide form, to reduce residual halogen in the treated water to a physiologically acceptable level. In the first step of the process, the water containing the microorganisms elutes elemental halogen from the resin to provide a halogen concentration in the water exceeding 5 p.p.m. (5000 p.p.b.). On the completion of the bactericidal action, the residual halogen is reduced to a level of no more than 1.0 p.p.m. by passing the soluiton through a second anion exchange resin capable of absorbing the halogen.

Based on prior knowledge, such as the teachings of these patents, the method of the present invention and the form of the resin used therein are believed to be unobvious, and the results obtained to be of a surprising and unexpected nature. No one heretofore has provided the water treatment art with a means and method for disinfecting water with iodine (or other halogen) without introducing the halogen into the water in a detectable concentration.

In accordance with the present invention, a strong base anion exchange resin is reacted with triiodide ions to form a stable compound of extremely low dissociation in water. The association of the triiodide ions with the basic exchange sites (cationic groups) of the resin is such as to block the sites from normal ion exchange with ions in the solution. The amount of iodine ($I_2$), triiodide ($I_3^-$), or other oxidizing form of iodine liberated in the water is negligible, being below the ordinary limits of detection. Nevertheless, the resin compound is a potent bactericide. By some mechanism not yet fully understood, the insolubilized triiodide groups of the resin "interact" with bacteria without forming a detectable concentration of iodine (or any oxidizing form thereof) in the water. The killed bacteria do not remain attached to the resin, but will readily pass on through a bed of the resin. Complete bacterial sterilization of highly contaminated water can thus be achieved without introducing objectionable amounts of iodine into the water. The amount of iodine liberated, if any, by the interaction of the bacteria with the insolubilized triiodide is below the limits of detection by the highly sensitive cadmium iodide-linear starch test. The disinfected water is thereby ready for immediate use as drinking water, or for other applications where bacterially sterile iodine-free water is desirable. No further treatment will ordinarily be required.

DETAILED DESCRIPTION

The present invention can be practiced with any strong base anion exchange resin, but quaternary ammonium anion exchangers are preferred, the term "strong base anion exchange resin" designates a class of resins either containing strongly basic (cationic) groups, such as quaternary ammonium groups, or which have strongly basic properties substantially equivalent to quaternary ammonium anion exchange resins. The classification of "strong base" resins contrasts with the "weak base" resins where the basic groups are amine nitrogen rather than quaternary ammonium groups. In addition to the quaternary ammonium resins, which are commercially available from a number of companies, other strong base resins are known, such as the tertiary sulfonium resins, the quaternary phosphonium resins and the alkyl pyridinium resins. Literature citations showing methods of preparation of strong base anion exchangers not readily commercially available in the United States are:

*Tertiary Sulfonium Anion Exchangers:* G. J. de Jong (to Stamicarbon N.V.), U.S. Pat. 2,713,038, July 12, 1955, and Staatsmijnen in Limburg, Directie van de, Dutch Pats. 72,245, Apr. 15, 1953, and 75,968, Sept. 15, 1954; British Pat. 737,924, Oct. 5, 1955.

*Quaternary Phosphonium Anion Exchangers:* Stamicarbon N.V., Dutch Pat. 75,705, Aug. 16, 1954.

*Alkyl Pyridinium Anion Exchangers:* U.S. Pat. 2,739,948, Mar. 27, 1956.

Commercially available quaternary ammonium anion exchange resins which can be used in practicing the present invention include Rexyn 201 (Fisher Scientific Co.), Amberlite IR A-400 and Amberlite A-401 S (Mallinckrodt Chemical Works), Ionac A-540 (Matheson, Coleman & Bell) Dowex 1 and Dowex 21K (Dow Chemical Co.), and Duolite A-101D and ES-109 (Diamond Shamrock Chemical Co.). These resins all have quaternary ammonium ion exchange groups, and are supplied in the salt form, usually as the chloride or sulfate, and are in the form of porous granular or "beads" of various mesh sizes.

The terms "triiodide" or triiodide ion" as used in this application refer to ions formed from iodine which have a valence of −1, but which contain three iodine atoms. The iodine ion ($I^-$) combines with molecular iodine ($I_2$) to form the triiodide ion ($I_3^-$). If more of the elemental iodine ($I_2$) combines with the monovalent triiodide ion ($I_3^-$) higher polyiodide ions can be formed, for example, the polyiodide ions $I_5^-$, $I_7^-$, etc.

The only polyiodide or other polyhalide usable in the present invention is the triiodide. Higher polyiodide ions, although combined with the strong base anion exchange resin, release molecular iodine ($I_2$) into the solution. The trihalides other than triiodide also release halogen into the water although absorbed on strong base anion exchange resins. The triiodide is unique in that the iodine of the triiodide resin compound is not eluted by contact with water down to and below detection limits. It is believed that concentration of oxidizing iodine in the column eluents is so negligible as to be in the range of 50 to 200 p.p.b., and perhaps below 100 p.p.b. (parts per billion).

Suitable procedures for preparing solutions and salts of polyhalide ions, including the polyiodide, are described in the literature. (See, for example, A. I. Popov and R. E. Buckles, "Polyhalogen Complex Salts," Preparation No. 46, in Inorganic Syntheses, Vol. V, ed. by T. Moeller, McGraw-Hill Book Company, Inc., New York, 1957, pp. 167–178.) In following such procedures for the purposes of the present invention, molecular iodine can be dissolved in a water solution of the iodide salt. For example, iodine is dissolved in a solution of sodium or potassium iodide. This solution will contain the monovalent ion $I^-$ which will combine with the dissolved iodine $I_2$, to form the polyiodide ions. By employing one mole of $I_2$ per mole of $I^-$, substantially only the triiodide ions will be formed. If stoichiometric excess quantities of $I_2$ are used, some of the higher polyiodide ions may be formed, and special steps may be necessary to remove the excess iodine from the resin. In an alternative procedure, the resin can be first converted to the iodide ($I^-$) form by contacting it with a solution of potassium or sodium iodide, or other iodide salt, and a stirred aqueous slurry of the converted resin is contacted with elemental iodine ($I_2$) to react with the absorbed $I^-$ to form bound $I_3^-$. This procedure is less desirable, since it is more difficult to assure precise saturation of the column with triiodide.

In preparing the resin for use in the method of this invention, the aqueous solution of the triiodide ions can be contacted with a salt form of the resin at ordinary room temperatures (25 to 30° C.) to obtain the disinfectant. The reaction can be carried out in batch, the reacted resin being separated from the solution by filtration or centrifugation. However, it is convenient to react the resin in a bed or column by flowing the triiodide solution through the resin. The essential reaction can be visualized as follows:

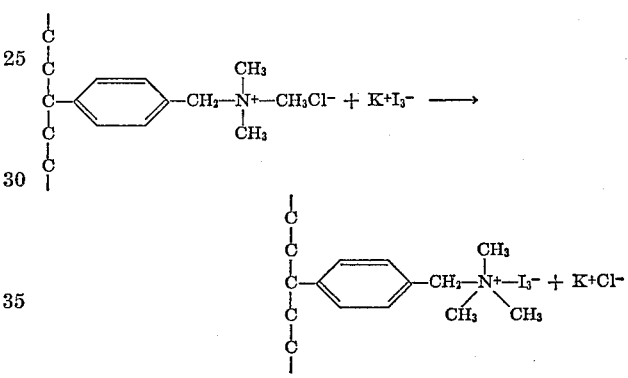

In the above equation, the quaternary ammonium anion exchange resin is represented with three methyl groups bonded to the basic nitrogen, which is also bonded to the styrene polymer, and the resin is shown as being originally in the chloride form. It will be understood, however, that other short chain aliphatic groups can be bonded to the nitrogen, such as ethyl or hydroxyethyl groups.

In the resin-triiodide compound, as indicated, the triiodide becomes closely bound to the fixed quaternary ammonium group, or other strongly basic group, and is thereby insolubilized. The potassium and chloride ions can be readily washed out of the resin compound. If excess triiodide or iodine is present in the reaction solution, this must be washed out of the resin compound by percolating water through a column or bed, or by batch washing, followed by filtration or centrifugation. Distilled or ion free water can be used for the washing. It is preferable to avoid loading the resin with a stoichiometric excess of triiodide, since prolonged washing may be required to remove the excess.

As a preferred variation of the preparatory procedure, the reacted resin can first be washed with an aqueous iodide salt solution before being washed with water. These washes can be alternated and repeated as required with the final wash being ion free water. The procedure of an iodide salt wash is particularly desirable if the reaction solution may have contained polyhalide ions higher than $I_3^-$. For example, an iodide ($I^-$) salt solution (viz. sodium, potassium, or ammonium iodide) can be used. The iodide salt solution will convert any resin-bonded higher polyiodides ($I_5^-$, $I_7^-$, etc.) into the triiodide by removal of the excess $I_2$ to form solution $I_3^-$ ions from the solution $I^-$ ions. Washing with water, if continued long enough, can accomplish the same result. Preferably, care is exercised to use no more than the stoichiometric proportions of $I^-$ and $I_2$ so that substantially only triiodide attaches to the resin. The resin can be under-saturated with triiodide with a corresponding reduction in killing capacity. Since the capacity is great due to the demand action, reductions to 70 to 80% saturation are practical. However, the desired stable washed-out resin compound can readily be prepared by using only a slight reduction in the stoichiometric proportion, such as 96 to 98% saturation, and the resulting reduction in capacity is insignificant.

The triiodide resin compound, formed as described, can be used to disinfect water by batch contacting with the contaminated water, but continuous processing is preferred. Water containing the viable bacteria to be killed is preferably passed through a bed of porous granular material, which consists of the strong base anion exchange resin prereacted with the triiodide ions. The maximum permissible flow rates for total bacterial sterilization will vary with the concentration of the triiodide groups in the resin and with the concentration of live bacteria in the water. However, sufficiently high flow rates are feasible so that the water being disinfected can be pumped through columns of the resin compound while obtaining 100% kill of the bacteria. The progress of the disinfecting can be checked by taking samples of the water after treatment. In practice, potable innocuous water is readily produced, the contaminated water being rendered bacterially sterile without being made non-drinkable by the incorporation of physiologically objectionable free iodine.

The novel features of the present invention are further illustrated by the following examples.

EXAMPLE I

A typical batch of quaternary ammonium (strong base) ion exchange resin-triiodide ion bactericide, for use on a laboratory scale, was prepared in the following manner. Solid iodine was added to a 1 molar aqueous solution of potassium iodide (166 grams potassium iodide per liter of solution) so as to produce an iodide:iodine ratio of 3.5:1. Sufficient volume of this solution was used to provide a calculated excess over the capacity of the quantity of strong base resin used. The resin beads (in the commercial chloride or sulfate form) were placed in a glass column and the potassium triiodide solution was passed through at a slow rate so as to saturate the resin's quaternary ammonium exchange sites with triiodide ion, after which the column was thoroughly washed with distilled water. Final washes or the column so prepared showed no detectable oxidant (iodine or triiodide ion), when tested with cadmium iodide-linear starch reagent, or iodide ion, when tested with silver nitrate solution. Resin triiodide combinations, prepared from Ionac A–540 (Matheson, Coleman and Bell) Rexyn 201 (Fisher Scientific Co.), or Amberlite IRA–400 (Mallinckrodt Chemical Works) strong base ion exchange resins in the chloride or sulfate forms, all were effective in making complete kills of concentrations of $10^6$ bacteria per milliliter and higher. Bacteria tested included *Escherichia coli, Streptococcus faecalis,* and *Staphylococcus aureus.* Several other methods of preparation of the resin-polyiodide bactericide were also used in addition to that described in detail above, with comparable results. In one alternative, the reacted resin is washed with an aqueous solution of potassium iodide before washing with the distilled water, to insure conversion of any excess iodine or higher polyiodide ions to $I_3^-$, thereby insuring saturation of the resin ion exchange sites with triiodide ion.

An alternative procedure for the preparation of the disinfectant is to react the quaternary ammonium strong base resin in the chloride or sulfate form batchwise with the proper amount of the 3.5:1 iodide-iodine solution as described above, rather than in a column. After adequate time for reaction, the procedure is continued as above.

In still another alternative procedure, the quaternary ammonium strong base resin in the chloride or sulfate form is first reacted with a solution of potassium iodide or other iodide salt to convert it to the iodide form. After thorough washing to remove excess iodide salt solution, the disinfectant is prepared by either of the methods described above.

To achieve the stable resin-triiodide disinfectant with a reduction in the amount of washing required, slightly less than stoichiometric proportions of triiodide to basic sites can advantageously be used. For example, proportions giving 96–98% saturation (molar basis) of the basic sites with triiodide are desirable.

EXAMPLE II

Another mode of practicing the present invention is as follows:

React a solution consisting of 16.6 parts by weight of potassium iodide and 7.26 parts by weight of iodine dissolved in 100 parts by weight of water through a weight of quaternary ammonium resin beads sufficient to yield a combination consisting of one quaternary ammonium site to one triiodide, $I_3^-$, ion.

Wash thoroughly with distilled water until the eluent tests negative for iodine, polyiodide or other oxidant with a cadmium iodide-linear starch reagent (see Example IX), and negative for iodide ion with silver nitrate solution. In an alternative procedure, the reacted resin is washed with an aqueous solution of potassium iodide before washing with the distilled water to insure the conversion of any excess iodine or higher polyiodide ions to $I_3^-$, thereby insuring saturation of the resin exchange sites with triiodide ions.

Similar resin-polyiodide combinations, prepared from Ionac A–540 (Matheson, Coleman and Bell), Rexyn 201 (Fisher Scientific Co.), or Amberlite IRA–400 (Mallinckrodt Chemical Works) strong base ion exchange resins in the chloride or sulfate forms, all were effective in making complete kills of concentrations of $10^6$ bacteria per milliliter and higher. (See Examples IV and VII.)

EXAMPLE III

When prepared as described in Examples I and II, the resin-triiodide column can be treated with distilled water or with solutions of up to 500 parts per million of sulfate, chloride or nitrate ions, without detectable concentrations of iodine, triiodide or other oxidant appearing in the eluent. The tests are made with a cadmium iodide-linear starch reagent: Lambert, *Anal. Chem., 23,* 1247 (1957); Lambert and Rhodes, *Anal. Chem., 28,* 1629 (1956), which will detect concentrations of iodine or its equivalent of other oxidizing agents down to at least 0.2 parts per million 200 p.p.b.). Under some conditions, the sensitivity may extend to as low as 50–100 p.p.b. oxidizing iodine. See Lambert and Olguin, *Anal. Chem., 41,* 838 (1969). The total concentration of iodine in all forms in the eluent (including the non-oxidizing $I^-$) when distilled water is passed through the column was less than 0.5 parts per million (500 p.p.b.) as determined by neutron activation analysis. Iodide ion release when distilled water is passed through the column produces no more than a faint turbidity of silver iodide when tested with silver nitrate solution. Release of iodide ion is no greater than that with distilled water when solutions of the following anions are passed through the column: 50 parts per million of sulfate ion, or 100 parts per million each of chloride or nitrate ions.

EXAMPLE IV

Typical bacteria kills, when 3.8 grams of Ionac A–540 quaternary ammonium ion exchange resin in the stable triiodide form was used in a column three-sixteenth inch by four inches with a flow rate of 20 milliliters per minute, were as follows: suspensions of *Escherichia coli* were reduced from $1.3 \times 10^5$ to zero viable counts per milliliter; suspensions of *Streptococcus faecalis* were reduced from $1.1 \times 10^4$ to zero viable counts per milliliter;

and suspensions of *Staphylococcus aureus* were reduced from 1.8×10⁴ to zero viable counts per milliliter. The standard membrane filter technique was used to count *E. coli* and *S. faecalis;* the standard agar plate count was employed to determine *S. aureus* numbers. With the untreated resin in the chloride or sulfate form, suspensions of *E. coli* were reduced from 200 viable bacteria per milliliter to 120 per milliliter, indicating little if any kill or retention in the untreated column. When 30 grams of Rexyn 201 resin-triiodide combination was used in a column, suspensions of ¹⁴C-labeled *E. coli* with viable count of 3.0×10⁵ per milliliter were reduced to zero viable count per milliliter; recovery of radioactivity in the eluent averaged 95.2% when samples were taken at 100 milliliter intervals up to 600 milliliter total sample, indicating that practically all of the killed bacteria passed through the column. Similar results were obtained with ¹⁴C-labeled *S. faecalis*. A 4.0 gram column of Ionac A–540 resin-triiodide combination, on an attempted exhaustion test, killed 1.95×10⁹ *E. coli* in 15 liters, with little loss in effectiveness up to the time the test was discontinued.

Standard sterile nutrient broth was charged with approximately 100 *E. coli* per milliliter through an Ionac A–540 triiodide column, the viable count was reduced to zero, but the nutrient broth on subsequent inoculation supported *E. coli* growth. This indicates that organic matter in an aqueous medium, such as nutrient broth, is not substantially altered by contact with the column.

EXAMPLE V

Laboratory scale preparations of quaternary ammonium (strong base) ion exchange resins according to a method similar to that set out in the foregoing examples were made with Rexyn 201 (Fisher Scientific Co.) and Amberlite IRA–400 (Mallinckrodt Chemical Works) and tests of bacteria kills were made. A column of 30 grams of Rexyn 201-triiodide in a column measuring one inch by eight inches effected reduction of a suspension of 10⁵ viable *Escherichia coli* per milliliter to zero viable counts, when a flow rate of 60 milliliters per minute was used. The same resin without the bound triiodide ions effected a reduction of a suspension of 100 bacteria per milliliter to 30 viable counts per milliliter, indicating little if any kill by the untreated resin column. The same Rexyn 201 resin-triiodide ion combination at 20 ml./min. rate with a column weighing four grams and measuring three-sixteenths inch by four inches reduced the viable count of a suspension of 10⁴ *Streptococcus faecalis* per milliliter to zero. A similar column of Amberlite IRA–400 resin-triiodide ion combination effected total kill of a suspension of 1.3×10⁴ *E. coli* by reducing the viable counts to zero.

EXAMPLE VI

Other strong base resins can be used to prepare a resin-triiodide ion bactericide similar to those made with quaternary ammonium exchange resins, including tertiary sulfonium resins, quaternary phosphonium resins and alkyl pyridinium resins. A sample of a tertiary sulfonium ion exchange resin in the sulfate form was obtained, and a resin-triiodide ion column was prepared in the same manner as described above for quaternarry ammonium strong base resins. The capacity of this particular resin did not appear to be as great as the quaternary ammonium resins used, but upon treatment of a suspension of 1.35×10⁵ *E. coli* per milliliter with a column of this combination, the viable count was reduced to zero. This demonstrated that strong base resins other than quaternary ammonium resins can be used to prepare effective bactericides with triiodide.

EXAMPLE VII

Antibacterial test data are summarized in the following Tables A and B:

TABLE A

Antibacterial capabilities of indicated resin-I₃ complexes ᵃ

| Brand of resin | Description | Viable counts of *E. coli* per ml.ᵇ | |
|---|---|---|---|
| | | Before passing | After passing |
| Ionac A-540 (Matheson, Coleman & Bell). | Polystyrene alkyl quaternary ammonium type, medium porosity. | 3.0×10 | 0 |
| Stamex S-44 (Private source). | Polystyrene tertiary sulfonium type. | 1.3×10 | 0 |
| Rexyn 201 (Fisher Scientific Co.). | Polystyrene alkyl quaternary ammonium type, medium porosity. | 1.0×10 | 0 |
| Amberlite IRA-400S (Mallinckrodt Chemical Works). | -----do-------------------- | 1.4×10 | 0 |
| Do---------------- | Polystyrene alkyl quaternary ammonium type, high porosity. | 1.2×10 | 0 |

ᵃ 3.8 grams of each resin was treated with triiodide ion and tested for its ability to kill *E. coli* suspended in water flowing at a rate of 20 ml. per minute.
ᵇ Standard Methods for the Examination of Water and Waste Water, pp. 592–593, 12th ed. 1965, American Public Health Association, New York.

TABLE B

Table counts of indicated organisms ᵃ before and after passing through 3.8 gram columns of Ionac A-540-I³ ᵇ

| Organism ᵈ | Viable count per ml. | |
|---|---|---|
| | Before passing | After passing |
| *Salmonella typhimurium*---------------------- | 1.0×10⁵ | 0 |
| *Escherichia coli*---------------------------- | 3.0×10⁵ | 0 |
| *Pseudomonas aeruginosa*---------------------- | 1.3×10⁵ | 0 |
| *Staphylococcus aureus*----------------------- | 1.8×10⁴ | 0 |
| *Streptococcus faecalis*---------------------- | 1.1×10⁴ | 0 |

ᵃ Untreated and iodide saturated columns had negligible effects on the viable counts.
ᵇ The cells were suspended in water and passed through the columns at a flow rate of 20 ml. per minute.
ᶜ See note b, Table A.
ᵈ *E. coli* and *S. faecalis* are used as indicators of fecal contamination in the U.S.A. and Europe, respectively. Salmonella and Staphylococcus are pathogens. Pseudomonas (species) are water contaminants. Escherichia, Salmonella, and Pseudomonas are gram negative, whereas *S. faecalis* and *S. aureus* are gram positive.

A four year old, 30-gram column of the disinfectant dating to April 1968 (as the date of preparation) was found to be effective and able to kill 10⁶ *E. coli* (9.9×10⁵) 100% (total kill).

A 3.8-gram column of the disinfectant sterilized 15 liters of a suspension containing 10⁵ *E. coli* per ml. No decrease in killing ability was noted.

EXAMPLE VIII

The best mode presently known for preparing the triiodide resin disinfectant is as follows:

This procedure involves remethylation of the commercially obtained resin, which is usually in the chloride or sulfate form, conversion of the resin to the iodide form by treatment with potassium or other iodide salt solution, conversion of the iodide form of the resin to the triiodide form with a solution containing triiodide ion, washing with iodide salt solution to convert any higher polyiodides to the triiodide form, and thorough washing with distilled or deionized water. In the conversion step, the triiodide is applied slightly below the stoichiometric amount.

A typical preparation on a commercial scale would involve first conversion of any trialkyl amine sites on the resin to tetraalkyl ammonium sites by treatment with methyl iodide in 95% ethyl alcohol solution. This is done by taking an amount of methyl iodide sufficient to react with all the exchange sites as indicated by the capacity of the resin supplied by the manufacturer on a weight or volume basis. (In this manufacture of large quantities, this greatly liberal excess of required methyl iodide could be reduced considerably after study of the normal amount of non-quaternary ammonium sites to be expected in the resin.) The resin is allowed to react with the solution overnight, the remaining solution drained off, and the resin washed thoroughly with 95% ethanol, followed by washing with distilled or deionized water.

The remethylated resin is next treated with potassium iodide solution to convert all sites to the iodide form. This is done by treating the remethylated resin contained in a column with a solution of potassium or other soluble iodide salt. The amount of iodide required is calculated on a weight or volume basis from data supplied by the manufacturer; a several-fold excess of the iodide salt is used to insure complete conversion to the iodide form. The converted resin is thoroughly washed in the column with distilled or deionized water to a negative test with silver nitrate (essentially little turbidity of silver iodide).

The capacity of the resin, now in the iodide form, is accurately determined by measuring the volume and weight of a suitable size sample of the moist but not wet resin (no adhering water) for use in preparation either on a volume or a weight basis. A small amount is dried to constant weight at 95° C., and an accurately weighed 1–2 gram sample is then allowed to stand overnight with an accurately measured volume of 0.100 N solution of silver nirate that is in excess of the amount needed to react with all the iodide ion on the resin. The excess silver nitrate that is in excess of the amount needed to thiocyanate solution to the end point where ferric ion indicator turns red due to formation of $FeSCN^{++}$ (the Volhard method).

Depending on the type of preparation, a volume of resin in the iodide form is accurately measured, or a suitable amount of moist but not wet resin is weighed. By either method, a volume of solution containing triiodide ion in the amount of 97% (molar basis) of the capacity of the resin is added to the resin and the slurry stirred overnight with an overhead stirrer so as not to break the resin beads. The solution used contains sufficient iodine, $I_2$, dissolved in 1 M potassium iodide solution to yield a 3.5:1 solution of potassium iodide: iodine on a weight basis. A recipe would be as follows: add 16.6 parts by weight of potassium iodide (or equivalent weight of other soluble iodide salt) and 7.26 parts by weight of iodine to 100 parts by weight of water; add this solution to a sufficient weight or volume of resin in the iodide form such that the amount of triiodide in solution is 97% of the calculated anion capacity of the resin. Stir overnight with an overhead stirrer so as not to break the resin beads.

Drain the excess solution from the resin beads and place the resin beads in a column. Wash the resin beads with 1 M potassium iodide or other soluble iodide solution. After each wash with iodide solution, wash thoroughly with distilled or deionized water and test the eluent, first with silver nitrate solution and then with cadmium iodide-linear starch reagent. Repeat the washes until the tests are essentially negative (little or no turbidity with silver nitrate solution and no blue color with cadmium iodide-linear starch reagent). Store the prepared disinfectant in a sealed container.

EXAMPLE IX

Disinfected water and wash water can be tested with an analytical reagent sensitive to oxidizing iodine. One suitable reagent of this type is the cadmium iodide-linear starch reagent described in Lambert, *Anal. Chem.*, 23, 1247 (1951), and Lambert and Rhodes, *Anal. Chem.*, 28, 1629 (1956). See also Lambert and Olguin, *Anal. Chem.*, 41, 838 (1969).

The term "oxidizing iodine" as used herein is intended to refer to iodine in any oxidizing form thereof, including $I_2$, $I_3^-$, $IO^-$, $IO_3^-$, $IO_4^-$, etc. Fully reduced iodine in the form of iodide ion ($I^-$) is not included. According to well known procedures, if required, the presence of iodide ion ($I^-$) in the treated water can be detected by testing the water with silver nitrate. Usually, no more than a faint turbidity of silver iodide will be observed in the water.

The cadmium iodide-linear starch test reagent can be used for confirming that the content of oxidizing iodine in water which has been treated with the resin-triiodide combination to kill the bacteria therein is below detectable limits. A suitable procedure for tests of disinfected water is as follows: To a 20 ml. sample of the treated water, add one ml. of the cadmium iodide-linear starch reagent, and observe for appearance of a blue color which is indicative of oxidizing agents, such as an oxidizing form of iodine. The presence of a blue color will indicate that at least 200 p.p.b. or more of oxidizing iodine is present in the solution, while the absence of a blue color will indicate that the amount of oxidizing iodine present, if any, is below 200 p.p.b.

Where it is desired to pre-test a freshly prepared, or newly regenerated, batch of the resin-triiodide combination for use in a column, the 20 ml. sample of water can be obtained in the following manner: In a glass tube of $\frac{3}{16}''$ internal diameter, place a 3.8-gram sample of the dry resin-triiodide material. Pass distilled water through the resin bed thus formed at the rate of about 20 ml. per minute. The water may be at ordinary room temperature (i.e. 25–30° C.). From the test column, collect a 20 ml. sample of the wash water, and test by the procedure described above using the cadmium iodide-linear starch reagent. A negative test (no blue color) indicates the resin triiodide batch is in optimum form for using in treating bacterially contaminated water by the method of this invention.

The mechanism of action of the resin-insolubilized triiodide has not been fully established. Possibly, the antibacterial action can be explained by the assumption of a charge distribution in the bound triiodide of:

$$\text{Resin} \text{—} N^+ \text{---} I \text{--} I \text{--} I^{\delta+}$$

($\delta+$ designates a partial positive charge)

If the $I_3^-$ ion is polarized as indicated, the partial positive charge on the terminal iodine atom could be effective in attracting negatively charged bacteria to it. Once the bacterium and the bound $I_3^-$ group are in close enough proximity in the micro-environment of the resin beads' outer surfaces, it is possible that one or even two iodine atoms might react directly with the —SH groups of the cell wall.

Whatever the exact mechanism of action, it can be described generally as a "demand" action, as distinguished from the water elution of a bactericidal concentration of iodine. In other words, the release of the killing iodine by the resin is primarily in response to the presence of the bacteria. This general mode of action is responsible for the 100% kill of bacteria without leaving residual oxidizing iodine which must be removed. It is also responsible for the high killing capacity and long life of the disinfectant under ordinary conditions of use, such as the treatment of potable water at pH's from 6 to 8 and temperatures from 20 to 30° C. In fact, the disinfectant is substantially stable at pH's and temperatures outside these ranges. Experiments illustrating the properties of the resin are set out below:

EXAMPLE X

Triiodide-resin disinfectant was prepared as previously described and washed until no oxidizing iodine was detectable in the room temperature wash water. Temperature tests were then made on the disinfectant.

Boiling water at nearly 100° C. was passed through three 30-gram columns of the disinfectant. No iodine was eluted, according to the cadmium iodide-linear starch reagent test. The temperature remained above the 85° C. when tested, as it was collected in a flask. Traces of the halide ion, $I^-$, were detected in all the eluents. (The cadmium iodide-linear starch test was made after cooling the eluents to room temperature, as the reagent would not indicate the presence of iodine at 85° or 100° C.)

When three columns were placed in a bath at 80° C. for 24 hours, no iodine was detected by the cadmium iodide-linear starch test when the cooled solutions were tested at intervals of several hours. One of the columns was still able to effectively kill bacteria even after six days in the 80° C. bath.

EXAMPLE XI

An experiment bearing on the demand action of the stable triiodide resin disinfectant was conducted.

Three dialysis sacks, 0.25 inch in diameter, containing 3 ml. each of $1.4 \times 10^6$ *E. coli* per ml. were placed in a flask containing the resin-triiodide disinfectant. The sacks were securely tied at both ends. They then were placed in a 37° C. bath and shaken. The sacks were opened and tested as indicated in Table C.

TABLE C

| Sack number | Time in hours | No. of viable E. coli remaining in sack (per ml.)* | Dissolved iodine in sack solution |
|---|---|---|---|
|  | 0 | $1.4 \times 10^6$ |  |
| 1 | 2 | $1.05 \times 10^5$ | None. |
| 2 | 4 | $1.93 \times 10^5$ | Do. |
| 3 | 25 | **0 | Do. |

*Death rate probably approaching that of normal attrition (however, one cannot depend on attrition to completely sterilize water).
**One plate had the equivalent of $3.7 \times 10^4$ *E. coli*. fourteen plates were absolutely sterile.

The conclusion indicated is that bacteria contact or near contact is necessary. Mere dissolved iodine eluted from the resin disinfectant is not able to completely kill $10^6$ *E. coli* per ml. except after prolonged periods. However, if the customary disinfectant method employing column passage of the water plus viable bacteria, total kill of $10^6$ *E. coli* per ml. occurs within seconds. This is evidence that a demand phenomenon is operating. Otherwise the $10^6$ *E. coli* per ml. are not killed until sufficient iodine is removed from the resin-triiodide to satisfy the static equilibrium requirements.

EXAMPLE XII

An experiment to show that the killing mechanism does not depend on eluted iodine was conducted. The eluent from columns in which water is disinfected by the method of this invention contains less than 200 p.p.b. of iodine as $I_2$, as proven by the cadmium iodide-linear starch reagent test. When one p.p.m. of bacterial protoplasm ($10^6$ *E. coli* per mil.) is suspended in this water, previously passed through a column containing the resin-triiodide disinfectant, the *E. coli* are not all killed—over 1000 ($10^3$) per ml. remain viable. Yet when a suspension of $7.4 \times 10^7$ *E. coli* is passed through a column, 100% kill is obtained. The $7.4 \times 10^7$ bacteria represent 74 p.p.m. of bacteria protoplasm. The only way to supply the amount iodine necessary to get 100% kill and explain the phenomenon is on a demand basis. Merely dissolving iodine to the extent of 200 p.p.b. will not destroy 1 p.p.m. ($10^6$ bacteria) of live *E. coli*.

We claim:

1. The method of disinfecting bacterially contaminated water to obtain disinfected water which does not require further treatment to remove residual disinfectant, comprising passing contaminated water containing viable bacteria through a bed of porous granular material containing a demand bactericide, said bacteria having a negatively charged characteristic, said demand bactericide consisting essentially of a strong base anion exchange resin having insolubilized triiodide in association with the strongly basic groups of said resin, said granular material being characterized by containing a sufficient amount of said demand bactericide to substantially disinfect said water as it passes through said bed, while being essentially free of water-elutable oxidizing iodine as determinable by washing a sample of said demand bactericide with distilled water at 25 to 30° C. without liberating in said wash water a concentration of oxidizing iodine detectable by reacting a sample of said wash water with a cadmium iodide-linear starch test reagent, and removing the disinfected water from said bed which water as removed contains less than the lowest concentration of oxidizing iodine giving a detectable blue color on reaction of a sample of said removed water with a cadmium iodide-linear starch test reagent.

2. The method of claim 1 in which said resin is a polystyrene resin and said strongly basic groups are quaternary ammonium groups.

3. The method of claim 2 in which said water being disinfected is potable water, and in which said water as removed has been completely disinfected.

4. The method of disinfecting bacterially contaminated water with oxidizing iodine which does not require further treatment of the water to remove residual oxidizing iodine, comprising passing potable water containing viable bacteria through a bed of porous granular material containing a polystyrene resin having basic nitrogen groups bonded thereto, said bacteria having a negatively charged characteristic, said basic nitrogen groups consisting essentially of quaternary ammonium groups, said quaternary ammonium groups having oxidizing iodine in association therewith, said oxidizing iodine consisting essentially of triiodide groups, said granular material being characterized by containing a sufficient amount of said oxidizing iodine to substantially disinfect said water as it passes through said bed, while being essentially free of water-elutable oxidizing iodine as determinable by washing a sample of said granular material with distilled water at 25 to 30° without liberating in said wash water a concentration of oxidizing iodine detectable by reacting a sample of said wash water with a cadmium iodide-linear starch test reagent, and removing the disinfected water from said bed which water as removed contains less than the lowest concentration of oxidizing iodine giving a detectable blue color on reaction of a sample of said removed water with a cadmium iodide-linear starch test reagent.

5. The method of claim 4 in which said water being disinfected is potable water, and in which said water as removed has been completely disinfected.

References Cited

UNITED STATES PATENTS

| | | | |
|---|---|---|---|
| 3,462,363 | 8/1969 | Mills | 210—62 X |
| 3,316,173 | 4/1967 | Mills et al. | 210—62 |
| 3,425,790 | 2/1969 | Sloan | 210—37 X |
| 3,436,345 | 4/1969 | Goodenough et al. | 210—62 |

SAMIH N. ZAHARNA, Primary Examiner

T. G. WYSE, Assistant Examiner

U.S. Cl. X.R.

210—64, 501; 21—58; 424—79, 150